(12) United States Patent
Han et al.

(10) Patent No.: US 10,104,382 B2
(45) Date of Patent: Oct. 16, 2018

(54) IMPLEMENTATION DESIGN FOR HYBRID TRANSFORM CODING SCHEME

(71) Applicant: GOOGLE INC., Mountain View, CA (US)

(72) Inventors: Jingning Han, Santa Clara, CA (US); Yaowu Xu, Saratoga, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/651,619

(22) Filed: Jul. 17, 2017

(65) Prior Publication Data

US 2017/0324964 A1 Nov. 9, 2017

Related U.S. Application Data

(63) Continuation of application No. 14/087,568, filed on Nov. 22, 2013, now Pat. No. 9,712,829.

(51) Int. Cl.
| | |
|---|---|
| *H04N 19/176* | (2014.01) |
| *H04N 19/42* | (2014.01) |
| *H04N 19/12* | (2014.01) |
| *H04N 19/60* | (2014.01) |
| *H04N 19/159* | (2014.01) |
| *H04N 19/625* | (2014.01) |
| *H04N 19/593* | (2014.01) |
| *H04N 19/61* | (2014.01) |

(52) U.S. Cl.
CPC ........... *H04N 19/176* (2014.11); *H04N 19/12* (2014.11); *H04N 19/159* (2014.11); *H04N 19/439* (2014.11); *H04N 19/60* (2014.11); *H04N 19/593* (2014.11); *H04N 19/61* (2014.11); *H04N 19/625* (2014.11)

(58) Field of Classification Search
CPC .... H04N 19/176; H04N 19/159; H04N 19/60; H04N 19/12; H04N 19/439; H04N 19/625; H04N 19/61; H04N 19/593
USPC ........................................................ 345/506
See application file for complete search history.

(56) References Cited

U.S. PATENT DOCUMENTS

| | | | |
|---|---|---|---|
| 5,805,739 A | 9/1998 | Malvar et al. | |
| 6,134,571 A | 10/2000 | Kresch et al. | |
| 6,189,021 B1 * | 2/2001 | Shyu | G06T 9/007 |
| | | | 708/401 |

(Continued)

FOREIGN PATENT DOCUMENTS

| | | |
|---|---|---|
| CN | 103282958 A | 9/2013 |
| KR | 20050065548 A | 6/2005 |

(Continued)

OTHER PUBLICATIONS

"VP9 Video Codec Summary", The WebM Project, (http://www.webmproject.org/vp9/) on Aug. 8, 2013, 2 pages.

(Continued)

*Primary Examiner* — Ke Xiao
*Assistant Examiner* — Kim-Thanh T Tran
(74) *Attorney, Agent, or Firm* — Brake Hughes Bellermann LLP

(57) ABSTRACT

A method and system may identify a video data block using a video codec and apply a transform kernel of a butterfly asymmetric discrete sine transform (ADST) to the video data block in a pipeline.

20 Claims, 9 Drawing Sheets

(56) References Cited

U.S. PATENT DOCUMENTS

| | | | |
|---|---|---|---|
| 7,782,955 B2 | 8/2010 | Wu et al. | |
| 7,949,196 B2 | 5/2011 | Bossen | |
| 8,682,645 B2 | 3/2014 | Taleb et al. | |
| 8,885,701 B2 | 11/2014 | Saxena et al. | |
| 2004/0117418 A1 | 6/2004 | Vainsencher et al. | |
| 2004/0151253 A1* | 8/2004 | Bossen | G06T 9/007 375/243 |
| 2006/0147125 A1* | 7/2006 | Caviedes | G06T 7/0004 382/266 |
| 2012/0057630 A1* | 3/2012 | Saxena | H04N 19/105 375/240.03 |
| 2013/0108185 A1 | 5/2013 | Kenji | |
| 2013/0268264 A1 | 10/2013 | Taleb et al. | |
| 2015/0145874 A1 | 5/2015 | Han et al. | |

FOREIGN PATENT DOCUMENTS

| | | |
|---|---|---|
| KR | 20130098360 A | 9/2013 |
| WO | 2015/077476 A1 | 5/2015 |

OTHER PUBLICATIONS

First Examiner Report from AU2014352947, dated Mar. 14, 2017, 4 pages.

Office Action from CA2,931,226, dated Mar. 14, 2017, 7 pages.

Extended European Search Report from EP14863523.8, dated May 12, 2017, 11 pages.

Gluth, Rolf, "Regular Fft-Related Transform Kernels for Dct/Dst-Based Polyphase Filter Banks", Institution of Electronics Engineers, International Conference on Acoustics, Speech &Signal Processing, vol. Conf. 16, Apr. 14, 1991, pp. 2250-22018.

Gluth, R , et al., "Regular FFT-related transform kernels for DCT/DST-based polyphase filter banks", International Conference on Acoustics, Speech, and Signal Processing; Apr. 14-17, 1991, vol. 3, pp. 2205-0208.

Han , et al., "A Butterfly Structured Design of the Hybrid Transform Coding Scheme", Picture Coding Symposium, 2013, 17-20.

Han , et al., "Jointly Optimized Spatial Prediction and Block Transform for Video and Image Coding", IEEE Transactions on Image Processing, vol. 21, No. 4, Apr. 2012, 1874-1884.

Han , et al., "Towards jointly optimal spatial prediction and adaptive transform in video/image coding", Han, et al, "Towards jointly optimal spatial prediction and adaptive transform in video/image coding," IEEE Proc. ICASSP, Mar. 2010, pp. 726-729., Mar. 2010, 726-729.

International Search Report and Written Opinion Received from PCT/US2014/066662 , dated Feb. 17, 2015, 14 pages.

Wang , "Fast Algorithms for the Discrete W Transform and for the Discrete Fourier Transform", IEEE Trans. on Acoustics, Speech, and Signal Processing, vol. ASSP-32, No. 4, pp. 803-816, Aug. 1984., Aug. 1984, 803-816.

First Office Action with English translation for Chinese Application No. 201480063614.2, dated May 4, 2018, 16 pages.

Han, Jingning et al., "Jointly Optimized Spatial Prediction and Block Transform for Video and Image Coding", IEEE Transactions on Image Processing, vol. 21, No. 4, Apr. 2012, 12 pages.

Office Action for Korean Application No. 10-2016-7016587, dated Jul. 19, 2018, 6 pages.

Communication pursuant to Article 94(3) EPC for European Application No. 14863523.8, dated May 24, 2018, 7 pages.

\* cited by examiner

IMPLEMENTATION DESIGN FOR HYBRID TRANSFORM CODING SCHEME

CROSS REFERENCE TO RELATED APPLICATION

This application is a continuation of, and claims priority to, U.S. application Ser. No. 14/087,568, filed Nov. 22, 2013 which is incorporated by reference herein in its entirety.

BACKGROUND

The present disclosure relates to image and video compression coding. In image or video compression coding, intra-frame coding refers to compression techniques to compress video or images within a single frame, and not relative to any other frame in a video sequence.

Transform coding is a central component in video and image compression. Optimization of the transform kernel may be used to exploit signal correlation for compression gains. Yet, on the hardware design side, a transform module may contribute a large portion of codec computational complexity. Accordingly, a need exists for systems, methods, and apparatus to address the shortfalls of present technology and to improve coding efficiency.

SUMMARY

A non-transitory computer-readable storage medium stores instructions that when executed cause a processor to perform a process. The instructions include instructions to identify a video data block using a video codec, and apply a transform kernel of a variant of an asymmetric discrete sine transform (ADST) to the video data block in a pipeline. The transform kernel may include a combination of a discrete cosine transform (DCT) and the variant of an asymmetric discrete sine transform (ADST) transform having a basis that is asymmetric. The instructions may produce a butterfly structured implementation of the intra-frame coding, using the variant of the ADST. The kernel may be of the form $$\sin\frac{(2n-1)(2k-1)\pi}{4N},$$

where N is the block dimension, and where n and k, respectively, denote a time index and a frequency index, where both n and k range from 1 to N. The butterfly structured implementation may be performed in integer format. The processor may communicate with a single instruction memory and control processor.

Other implementations of this aspect include corresponding systems, apparatus, methods, and computer programs, configured to perform the actions of the methods, encoded on computer storage devices.

Advantages of the systems and methods described here include, for example, efficient hardware utilization and code speed-up.

The details of one or more implementations are set forth in the accompanying drawings and the description below. Other features will be apparent from the description and drawings, and from the claims.

DETAILED DESCRIPTION

Figure 1:
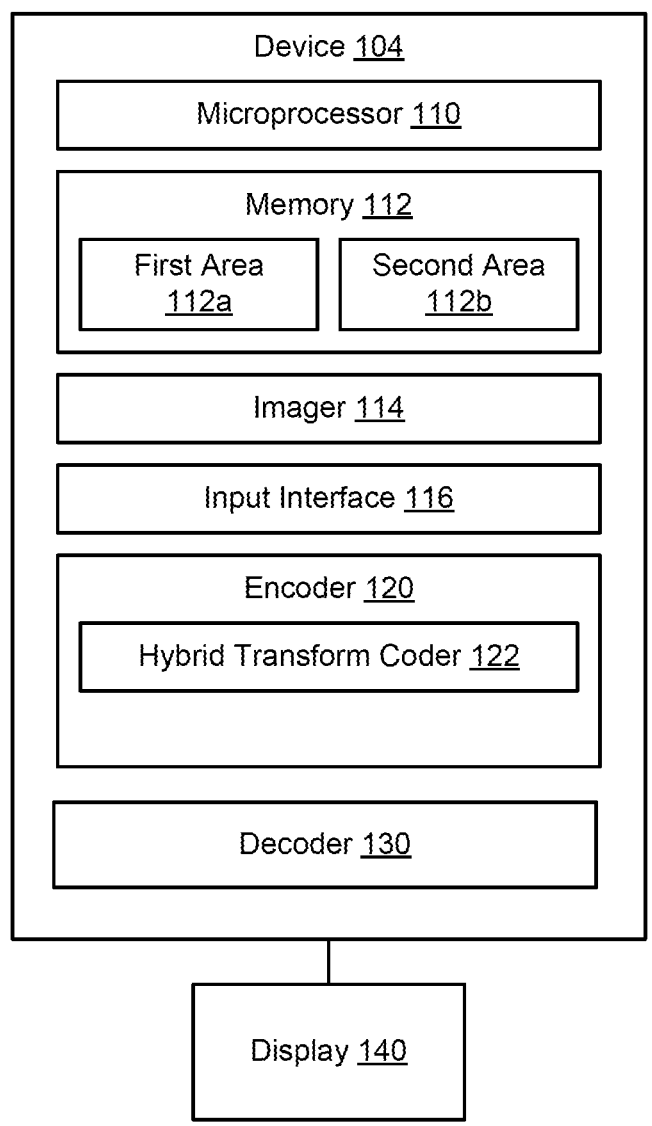
FIG. 1 is a block diagram illustrating an example system that may be used for hybrid transform coding.

In accordance with aspects of the disclosure, a method and system is presented herein to improve image or video compression performance. A disclosed method and system provides a way to implement intra-frame (within a single frame) coding and prediction used in video codec.

One motivation for employing a block coder is to separate a video frame into distinct regions, each of which may have its own locally stationary signal statistics. To achieve maximum compression efficiency, intra-frame coding exploits the local anisotropy (for instance, the occurrence of spatial patterns within a frame) via the spatial prediction of each block from previously encoded neighboring pixels, available at block boundaries.

A hybrid transform coding scheme allows choosing from discrete sine transform (DST) and asymmetric DST, depending on the quality and the availability of boundary information. A hybrid transform coding scheme may achieve bit savings at the same peak signal-to-noise ratio (PSNR). The overall intra coding scheme may switch between this variant of DST named asymmetric DST (ADST), and the conventional DCT, depending on the prediction direction and boundary information. This adaptive prediction-transform approach, also called a hybrid transform coding scheme, may outperform the DCT-based intra-frame prediction-transform coding. Yet, on the hardware design side, a transform module may contribute a large portion of codec computational complexity.

The fast Fourier transform is an efficient algorithm for calculating the discrete Fourier Transform of a sequence of N numbers. In the context of fast Fourier transform algorithms, a butterfly is a portion of a computation that combines results of smaller discrete Fourier transforms (DFTs) into a larger DFT, or vice versa, for example, breaking a larger DFT up into subtransforms.

The method and system described here improve on asymmetric discrete sine transform and on the hybrid transform coding, to create a butterfly asymmetric discrete sine transform to predict an intra-frame transform. An improved butterfly structured implementation that allows parallel computing via single instruction multiple data (SIMD) operations is described.

For transform dimension of 8×8 or above, it may be difficult to find an orthogonal matrix with elements that are small integers and an orthogonal matrix that approximates the DCT closely. Larger block size transforms provide higher transform coding gains for stationary signal and are experimentally proved to contribute compression efficiency in various video codecs. Challenges arise in the design of fast ADST, and hence hybrid transform coding scheme, of any block sizes. The original ADST kernel was derived as $$\sin\frac{n(2k-1)\pi}{2N+1},$$

where N is the block dimension, n and k denote the time and frequency indexes, respectively, both ranging from 1 to N. The DCT kernel, on the other hand, is of form $$\cos\frac{(2n-1)(k-1)\pi}{2N}.$$

The butterfly structured implementations of sinusoidal transforms exist if the denominator of the kernel argument, i.e., (2N+1) for the ADST and 2N for DCT, is a composite number (and can be decomposed into product of small integers). For this reason, many block-based video (and image) codecs are designed to make the block size power of two, e.g., N=4, 8, 16, etc., for efficient computation of DCT transformation. It, however, makes the original ADST not capable of fast implementation. For example, when N=8, (2N+1) turns out to be 17, which is a prime number that precludes the possibility of butterfly structure.

The methods and systems described herein resolve this intrinsic conflict between DCT and the original ADST because they include a new variant of ADST whose kernel is of the form $$\sin\frac{(2n-1)(2k-1)\pi}{4N}.$$

The denominator of the kernel argument, 4N, is consistent with that of DCT, in that if 2N is a power of two, so is 4N. Therefore, it can be implemented in a butterfly structure, and may also be referred to herein as btf-ADST.

The btf-ADST is has a basis with a similar asymmetric property as the original ADST. A system may use this btf-ADST to replace the original ADST in the hybrid transform coding scheme. The overall scheme selects the appropriate one-dimensional (1-D) transforms amongst the btf-ADST and DCT depending on the prediction direction to form a two-dimensional (2-D) transformation. For example, the system may apply a transform in a vertical direction to each column vector of a matrix.

FIG. 1 is a block diagram illustrating an example system 100 for hybrid transform coding, in accordance with aspects of the disclosure. In the example of FIG. 1, the system 100 includes a hybrid transform coding system that may be associated with a device 104, thereby transforming the device 104 into a special purpose machine designed to implement hybrid transform coding. In this sense, the device 104 may include various elements, including a microprocessor 110, a memory 112 such as a non-transitory computer-readable storage medium, power, peripherals, and various other elements not specifically shown in FIG. 1. The memory 112 may include one or more areas, such as a first area 112a and a second area 112b. The device 104 may include a display 140 (e.g., monitor or some other display) that may be used to display images (e.g., static images and/or video images). In some instances, various other elements of the device 104 that may be useful to implement the device 104 may be added or included, without departing from the scope of the present disclosure.

In some implementations, the system 100 may include an imager 114 configured to capture an image or images and generate uncompressed image data of the captured image or images. The imager 114 may be any device that converts an optical image into an electronic signal. In an example, the imager 114 may be a video camera configured to capture sequential images and generate uncompressed image data of the sequentially captured images. The imager 114 may include one or more sensors (e.g., any type of detector, such as a focal plane array) for capturing image signals representative of an image or images. The sensors of the imager 114 provide for representing or converting a captured image signal of an image or images as digital data (e.g., via an analog-to-digital converter included as part of the sensor or separate from the sensor as part of imaging system 100).

In an example, the imager 114 may include a static camera configured to capture a single static image and generate uncompressed image data of the captured image. In another example, the imager 114 may include a video camera configured to capture a plurality of sequential images and generate uncompressed image data of the sequentially captured images.

The system 100 may include an input interface 116 configured to receive image data from an external source including uncompressed image data. The input interface 116 may be configured to receive image data (e.g., static images or input video) streamed from another device. The input interface 116 may include one or more inputs for receiving image signals representative of an image or images. The one or more inputs of the input interface 116 may provide for receiving image signals of an image or images as digital data (e.g., via an analog-to-digital converter included as part of the input interface 116 or separate from the input interface 116 as part of the device 104).

The system 100 may include an encoder 120 configured to receive uncompressed image data and perform hybrid transform coding of the uncompressed image data.

The encoder 120 may include a hybrid transform coder 122 that is configured to provide intra-frame coding, as discussed in more detail below with respect to FIGS. 2A-4.

The system 100 may also include a decoder 130 configure to decode image data. The decoder 130 may operate by decoding an encoding made by the encoder 120, so that an original image or video information can be retrieved, for example In various implementations, the decoder 130 may be included in a separate system such as another computer device (not shown) that is separate from the device 104. In such a case, the device 104 may perform an encoding using the encoder 120, and a separate device may decode the encoding made by the encoder 120, so that the original image can be retrieved by the separate device, as an example.

In an implementation of the device 104, the imager 114 may be configured to capture an image or images and generate uncompressed image data of the captured image or images. In this instance, the encoder 120 may be configured to receive the uncompressed image data from the imager 114 and store the uncompressed image data in the first area 112a of the memory 112. In an example, the imager 114 may include a static camera configured to capture a single static image and generate uncompressed image data of the captured image. In another example, the imager 114 may include a video camera configured to capture a plurality of sequential images and generate uncompressed image data of the sequentially captured images.

In an implementation of the device 104, the imager 114 may be configured to capture an image or images and generate uncompressed image data of the captured image or images. In this instance, the microprocessor 110 may be configured to receive the uncompressed image data from the imager 114 and provide the encoder 120 with the uncompressed image data.

In an implementation of the device 104, the input interface 116 may be configured to receive image data of image or images. In this instance, the encoder 120 may be configured to receive the image data from the input interface 116 and store the image data in the first area 112a of the memory 112.

The display 140 may display the uncompressed image data of the captured image. The display 140 may include an image display device (e.g., a liquid crystal display (LCD)) or some various other type of video display or monitor. The microprocessor 110 may be adapted to display image data on the display 140. The microprocessor 110 may be configured to retrieve and obtain image data from memory 112 and display any retrieved image data on the display 140. The display 140 may include display electronics, which may be utilized by the microprocessor 110 to display image data. The display 140 may receive image data directly from imager 114 via microprocessor 110, or the image data may be transferred from the memory 112 via the microprocessor 110.

In the example of FIG. 1, the system 100 is illustrated using various components. However, such illustration is provided for clarity and convenience, and thus, in some instances, the various components may overlap or be combined within a described block(s) or module(s), or may be implemented by one or more block(s) or module(s) not specifically illustrated in the example of FIG. 1.

Figure 2A:
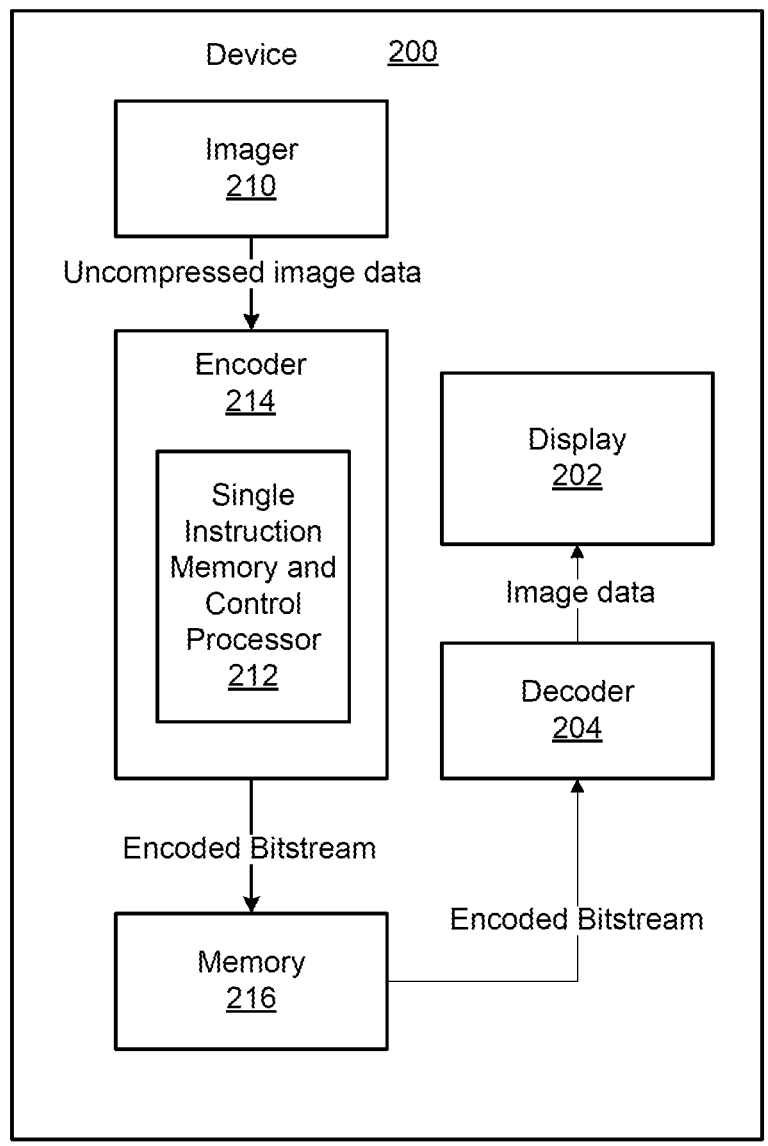
FIG. 2A is a block diagram illustrating an example imaging device that may be used for hybrid transform encoding.

FIG. 2A is a block diagram illustrating an example of an imaging device 200 that may be used for hybrid transform encoding, in accordance with aspects of the disclosure. As shown in FIG. 2A, a device 200 may include an imager 210, an encoder 214 including a single instruction memory and control processor 212, a memory 216, a decoder 204, and a display 202. In various implementations, the device 200 may represent one or more of various mobile devices including mobile phones, smartphones, laptops, televisions, or desktop computers. In various implementations the imager 210 may be remotely connected to the device 200, and the imager may represent various mobile devices such as mobile phones, consumer video cameras (e.g., compact, DSLR-video, etc), security video cameras, or any imager device that records and stores video digitally.

The imager 210 may capture an image and generate uncompressed image data of the captured image. The imager 210 may also be referred to as a camera sensor or an imaging sensor. The imager 210 may include a video imager that captures a plurality of sequential images and generate uncompressed image data of the sequentially captured images. In various examples, the imager 210 may capture one or more images and generate uncompressed image data of the captured images. The imager 210 may be any device that converts an optical image into an electronic signal. For instance, the imager 210 may be a video camera that captures a plurality of sequential images and generates uncompressed image data of the sequentially captured images.

The imager 210 may provide the uncompressed image data to the encoder 214. The encoder may operate in conjunction with a single instruction memory and control processor 212. The single instruction memory and control processor 212 may allow the encoder 214 to employ a butterfly structured implementation of a transform. The butterfly structured implementation of the transform that allows parallel computing via single instruction multiple data (SIMD) operations may be advantageous, and is discussed in more detail below with respect to FIGS. 3A-4. SIMD computers such as the device 200 may exploit data-level parallelism by applying the same operations to multiple items of data in parallel, as described in more detail below with respect to FIG. 2B. The single instruction memory and control processor 212 fetches and dispatches instructions. In an implementation, referring to the example of FIG. 2A, the single instruction memory and control processor 212 may receive the uncompressed image data or image signals from the imager 210 (e.g., via the encoder 214), and the single instruction memory and control processor 212 may process the received image signals (e.g., to provide processed image data), and provide an encoded bitstream to the memory 216. Embodiments described here may utilize a steaming SIMD extension 2 (SSE2) running on a 64-bit platform, as an example. The encoder 214 may perform a hybrid transform coding of the uncompressed image data, as discussed in more detail below with respect to FIGS. 3A-4.

In some implementations, the device may also include a decoder 204, which may apply an inverse transform to a residual pixel block data retrieved from the memory 216. The decoder 204 may thus decode an encoding, and then supply original image data to the display 202.

In the example of FIG. 2, the system 200 is illustrated using various components. However, such illustration is provided for clarity and convenience, and thus, in some instances, the various components may overlap or be combined within a described block(s) or module(s), or may be implemented by one or more block(s) or module(s) not specifically illustrated in the example of FIG. 2.

Figure 2B:
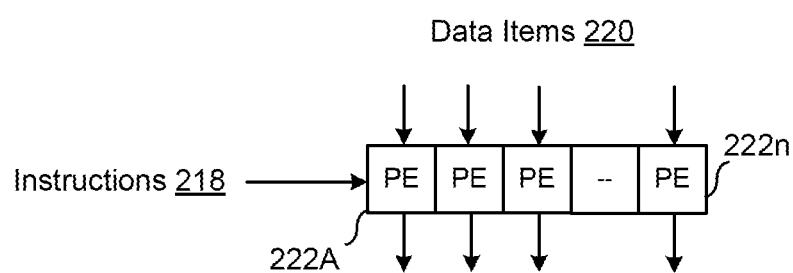
FIG. 2B is a block diagram illustrating an example of SIMD operations.

FIG. 2B is a block diagram illustrating an example of SIMD operations, which may be performed for example by the single instruction memory and control processor 212 shown in FIG. 2A in conjunction with encoding operations. In single instruction stream, multiple data stream (SIMD) processors, one instruction works on several data items simultaneously by using several processing elements (PEs), all of which may carry out the same operation as illustrated in FIG. 2B. A single instruction 218 works on several data items 220 at the same time by using PEs 222A through 222n. The PEs 222A through 222n may be implemented in an application specific integrated circuit (ASIC), for example. A SIMD processor has a single control unit reading instructions point to by a single program counter, decoding them and sending control signals to the PEs. Data such as the data items 220 may be supplied to and derived from the PEs 222A through 222n with as many data paths as there are PEs.

Figure 3A:
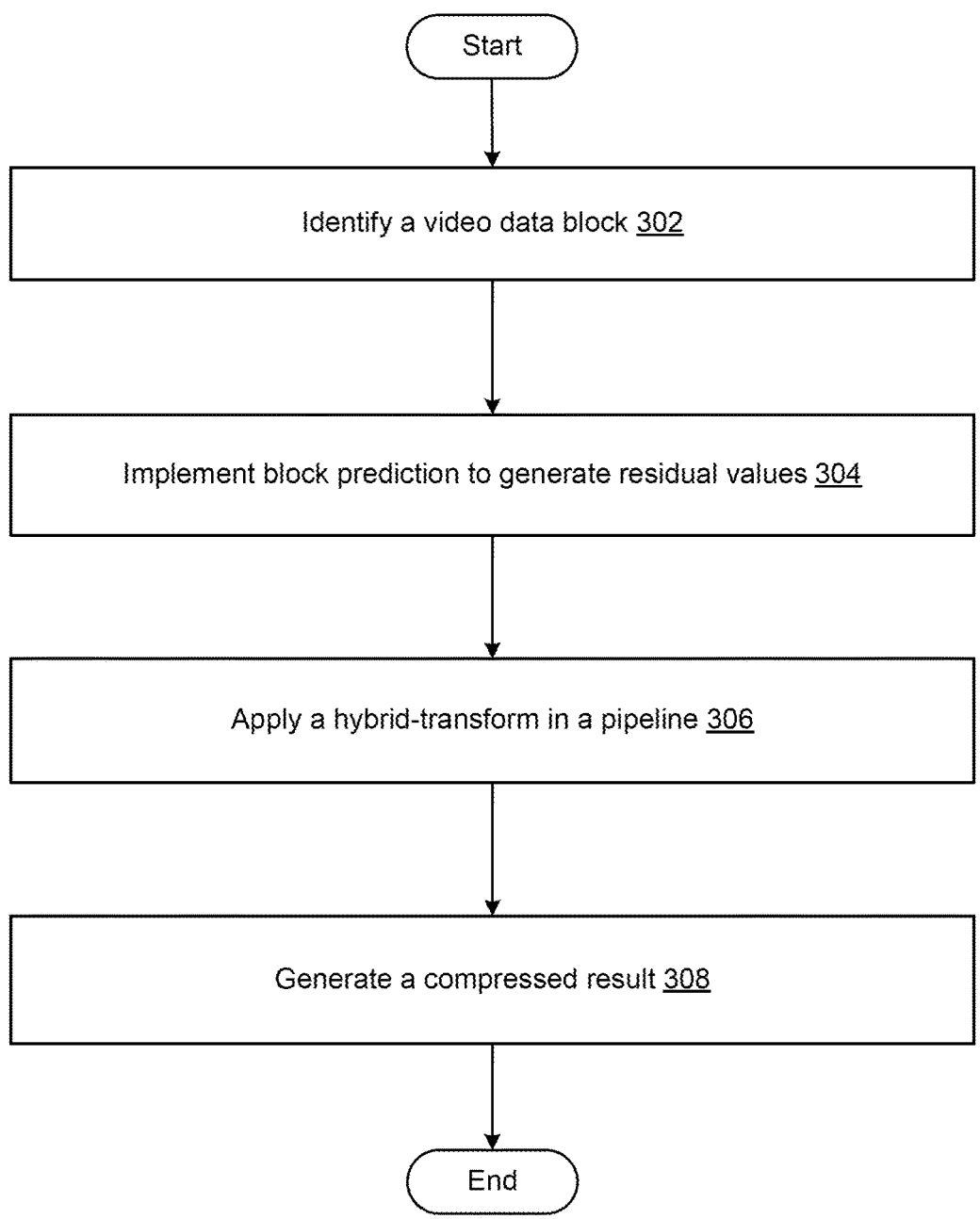
FIG. 3A is a flow diagram illustrating an example process that may be used for hybrid transform coding in a pipeline.

FIG. 3A is a flow diagram illustrating an example process that may be used for the hybrid transform coding in a pipeline. The operations of FIG. 3A may be performed, for example, by imaging device 104 of system 100, including by encoder 120, as shown in FIG. 1 or the encoder 214 shown in FIG. 2. The process includes identifying a video data block (302). The system may implement block prediction to generate residual values (304). For example, the system may use previously reconstructed pixels to predict the current pixel block. The system may subtract the above prediction from the current pixel block to generate a residual pixel block. The system may apply a hybrid-transform in a pipeline (306), for example as discussed below with respect to FIG. 3B. As one example, the system may apply a combination DCT of butterfly ADST to the residual pixel block, and quantize transform coefficients and code quantization levels. The system may then generate a compressed result (308) for use by a decoder, for example the decoder 130 shown in FIG. 1.

Figure 3B:
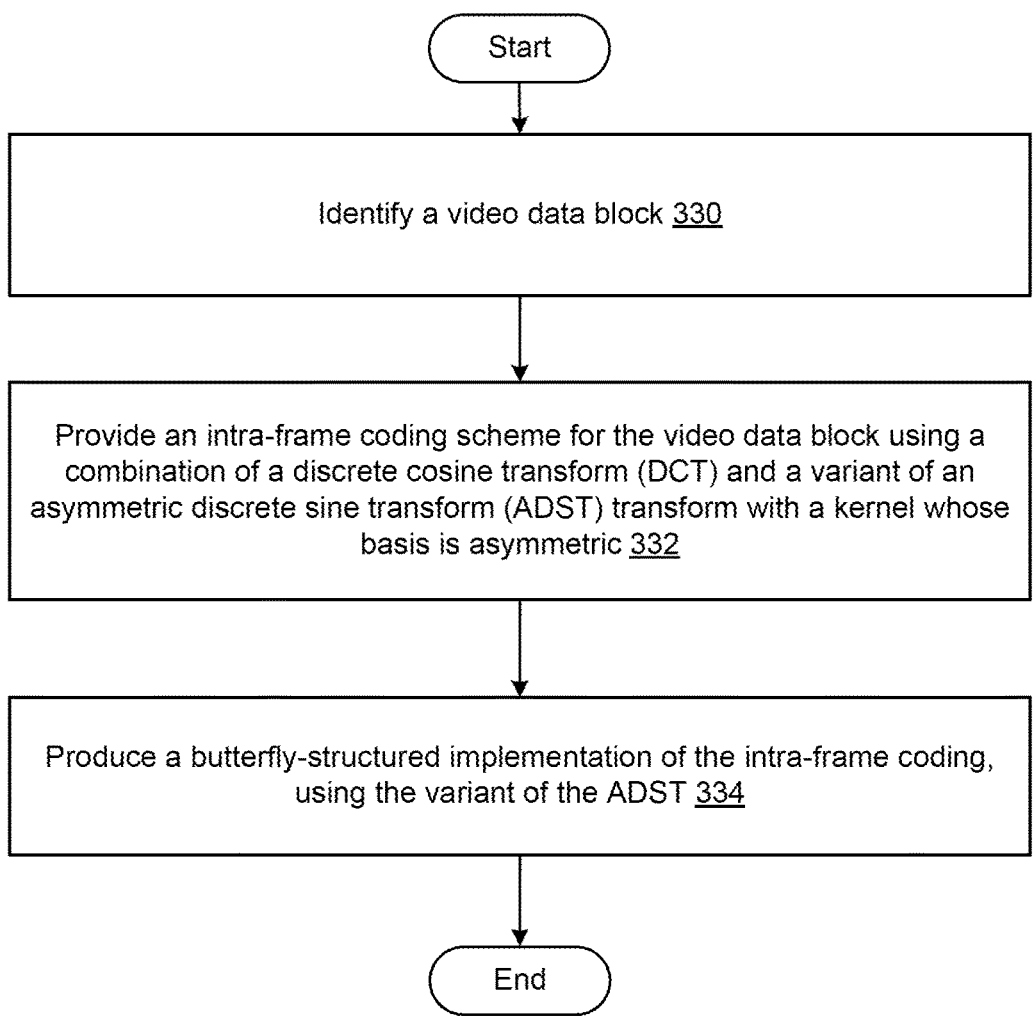
FIG. 3B is a flow diagram illustrating an example process that may be used for hybrid transform coding.

FIG. 3B is a flow diagram illustrating an example process that may be used for the hybrid transform coding. The operations of FIG. 3 may be performed, for example, by imaging device 104 or system 100 as shown in FIG. 1.

As shown in FIG. 3B, the system (for example, the microprocessor 110 shown in FIG. 1) may identify a video data block using a video codec (330). The system may provide an intra-frame coding scheme for the video data block using a combination of a discrete cosine transform (DCT) and a variant of an asymmetric discrete sine transform (ADST) transform whose kernel approximates an original ADST basis-wisely (i.e., whose basis is asymmetric) and is consistent with a DCT kernel (332). The system may produce a butterfly structured implementation of the intra-frame coding, using the variant of the ADST (which may include the DCT) (334).

Spatial Prediction and Transform Coding

To derive the variant of the ADST transform, the mathematical theory is examined that derived the original ADST, in the context of 1-D first-order Gauss-Markov model, given partial prediction boundary.

Consider a zero-mean, unit variance, first-order Gauss-Markov sequence $$x_k = \rho x_{k-1} + e_k \tag{1}$$

where $\rho$s the correlation coefficient, and $e_k$ is a white Gaussian noise process with variance $1-\rho^2$. Let $\underline{x}=[x_1, x_2, \ldots, x_N]^T$ denote the random vector to be encoded given $x_0$ as the available (onesided) boundary. The superscript T denotes matrix transposition. The recursion (1) translates into the following set of equations $$x_1 = \rho x_0 + e_1 \tag{2}$$

$$x_2 - \rho x_1 = e_2$$

$$\vdots$$

$$x_N - \rho x_{(N-1)} = e_N,$$

or in compact notation:

$$Q\underline{x} = \underline{b} + \underline{e} \tag{3}$$

where $$Q = \begin{pmatrix} 1 & 0 & 0 & 0 & \ldots \\ -\rho & 1 & 0 & 0 & \ldots \\ 0 & -\rho & 1 & 0 & \ldots \\ \vdots & \vdots & \vdots & \vdots & \vdots \\ 0 & \ldots & 0 & -\rho & 1 \end{pmatrix}, \tag{4}$$

and $\underline{b}=[\rho x_0, 0, \ldots, 0]^T$ and $\underline{e}=[e_1, e_2, \ldots, e_N]^T$ capture the boundary information and innovation process, respectively. It can be shown that Q is invertible, and thus:

$$\underline{x} = Q^{-1}\underline{b} + Q^{-1}\underline{e}, \tag{5}$$

where the superscript −1 indicates matrix inversion. As expected, the "boundary response" or prediction, $Q^{-1}\underline{b}$, in (5) satisfies $$Q^{-1}\underline{b} = [\rho x_0, \rho^2 x_0, \ldots, \rho^N x_0]^T. \tag{6}$$

The prediction residual $$\underline{y} = Q^{-1}\underline{e} \tag{7}$$

is to be compressed and transmitted, which motivates the derivation of its KLT. The autocorrelation matrix of $\underline{y}$ is given by:

$$R_{\underline{y}\underline{y}} = E\{\underline{y}\underline{y}^T\} = Q^{-1}E\{\underline{e}\underline{e}^T\}(Q^T)^{-1} = (1-\rho^2)Q^{-1}(Q^T)^{-1}. \tag{8}$$

Thus, the KLT for y is a unitary matrix that diagonalizes $Q^{-1}(Q^T)^{-1}$, and hence also the more convenient:

$$P_1 = Q^T Q = \begin{pmatrix} 1+\rho^2 & -\rho & 0 & 0 & \ldots \\ -\rho & 1+\rho^2 & -\rho & 0 & \ldots \\ 0 & -\rho & 1+\rho^2 & -\rho & \ldots \\ \vdots & \vdots & \vdots & \vdots & \vdots \\ 0 & \ldots & -\rho & 1+\rho^2 & -\rho \\ 0 & \ldots & 0 & -\rho & 1 \end{pmatrix}. \tag{9}$$

Although $P_1$ is Toeplitz, the element at the bottom right corner is different from all the other elements on the principal diagonal, i.e., it is not $1+\rho_2$.

This irregularity complicates an analytic derivation of the eigenvalues and eigenvectors of $P_1$. As a subterfuge, approximate $P_1$ with $$\hat{P}_1 = \begin{pmatrix} 1+\rho^2 & -\rho & 0 & 0 & \ldots \\ -\rho & 1+\rho^2 & -\rho & 0 & \ldots \\ 0 & -\rho & 1+\rho^2 & -\rho & \ldots \\ \vdots & \vdots & \vdots & \vdots & \vdots \\ 0 & \ldots & -\rho & 1+\rho^2 & -\rho \\ 0 & \ldots & 0 & -\rho & 1+\rho^2-\rho \end{pmatrix} \tag{10}$$

which is obtained by replacing the bottom-right corner element with $1-\rho^2-\rho$. The approximation clearly holds for $\rho \to 1$, which is indeed an approximation that describes the spatial correlation of video/image signals. The unitary matrix $T_s$ that diagonalizes $\hat{P}$, and hence an approximation for the required KLT of $\underline{y}$, can be shown as the following relative of the common DST:

$$[T_S]_{j,i} = \left(\frac{2}{\sqrt{2N+1}} \sin\frac{(2j-1)i\pi}{2N+1}\right) \tag{11}$$

where $j, i \in \{1, 2, \ldots, N\}$ are the frequency and time indexes of the transform kernel respectively.

Butterfly Structured Variant of ADST

An observation of the above derived ADST is that the rows of $T_s$, (i.e., basis functions of the transform) possess smaller values in the beginning (closer to the known boundary), and larger values towards the other end. For instance, consider the row with $j=1$ (i.e., the basis function with the lowest frequency). In the case where N>>1, the first sample $(i=1)$ is $\frac{2}{\sqrt{2N+1}}\sin\frac{\pi}{2N+1} \approx 0$, while the last sample (i=N) takes the maximum value $$\frac{2}{\sqrt{2N+1}}\sin\frac{N\pi}{2N+1} \approx \frac{2}{\sqrt{2N+1}}.$$

This effectively exploits the fact that pixels closer to the known boundary are better predicted and hence have statistically smaller variance than those at far end A unitary sinusoidal transform that resembles the compression performance of the ADST may overcome the intricacy of butterfly design of ADST and hence hybrid transform coding for parallel computing.

A new variant of DST is presented as:

$$[T_{btf}]_{j,i} = \left(\sqrt{\frac{2}{N}} \sin\frac{(2j-1)(2i-1)\pi}{4N}\right), \quad (12)$$

where j, i∈{1, 2, ..., N} denote the frequency and time indexes respectively. It also possesses the property of asymmetric basis function, but has the denominator of kernel argument, 4N, consistent with that of DCT, thereby allowing the butterfly structured implementation. We refer to it as btf-ADST.

In practice, all these computations may be performed in the integer format, which may incur rounding effects accumulated through every stage. To minimize or reduce the round-trip error, the structure is modified to make the initial stages consist of more multiplications, so that the rounding errors are less magnified. In keeping the conventions used in [6], let $\bar{I}$ and $D_N$ denote the re-ordering operations:

$$\bar{I} = \begin{bmatrix} & & & 1 \\ & & \cdots & \\ & \cdots & & \\ 1 & & & \end{bmatrix} \quad (13)$$

$$D_N = \begin{bmatrix} 1 & & & & \\ & -1 & & & \\ & & 1 & & \\ & & & \cdots & \\ & & & & -1 \end{bmatrix}.$$

Let $P_j$ be the permutation matrix that moves the first half of the vector entries to the even-numbered position, and the second half entries to the odd-numbered position but in a reversed order:

$$P_J = \begin{bmatrix} 1 & 0 & \cdots & & \\ 0 & \cdots & & 0 & 1 \\ 0 & 1 & \cdots & & \\ 0 & \cdots & & 1 & 0 \\ \cdots & \cdots & & & \cdots \end{bmatrix}, \quad (14)$$

Where J is the height of the matrix. It formulates a second permutation:

$$H_N = P_N \begin{bmatrix} P_{N/2} & \\ & P_{N/2} \end{bmatrix} \cdots \begin{bmatrix} P_4 & & & \\ & \bar{I}_4 P_4 \bar{I}_4 & & \\ & & \cdots & \\ & & & P_4 \\ & & & & \bar{I}_4 P_4 \bar{I}_4 \end{bmatrix}. \quad (15)$$

Similarly the permutation operator $Q_j$ moves the odd-numbered entries to be in reversed order:

$$Q_J = \begin{bmatrix} 1 & 0 & \cdots & & & \\ 0 & \cdots & & & 0 & 1 \\ 0 & 0 & 1 & \cdots & & \\ 0 & \cdots & & & 1 & 0 \\ \cdots & \cdots & & & & \cdots \\ 0 & 1 & 0 & \cdots & & 0 \end{bmatrix}. \quad (16)$$

Let $J=\log_2 N$ we define the following building blocks that formulate the butterfly structure.

Type 1 Translational Operators: matrices $U_N(j)$, j=1, 2, ..., J-1 are defined as $$U_N(j) = \begin{bmatrix} B(j) & & & \\ & B(j) & & \\ & & \cdots & \\ & & & B(j) \end{bmatrix}, \quad (17)$$

where $$B(j) = \begin{bmatrix} I_{2^j} & I_{2^j} \\ I_{2^j} & -I_{2^j} \end{bmatrix}. \quad (18)$$

Type 2 Rotational Operators: $V_N(j)$, j=1, 2, ..., J-1, are block diagonal matrices:

$$V_N(j) = \begin{bmatrix} I_{2^j} & & & & \\ & E(j) & & & \\ & & I_{2^j} & & \\ & & & \cdots & \\ & & & & E(j) \end{bmatrix}, \text{ where} \quad (19)$$

$E(j) = \text{diag}\{T_{1/2^{j+1}}, T_{5/2^{j+1}}, \ldots, T_{(2^{j+1}-3)/2^{j+1}}\}$ and $$T_r = \begin{bmatrix} \cos r\pi & \sin r\pi \\ \sin r\pi & -\cos r\pi \end{bmatrix}. \quad (20)$$

As a special case, $$V_N(J) = \begin{bmatrix} T_{1/4N} & & & \\ & T_{5/4N} & & \\ & & \cdots & \\ & & & T_{(2N-3)/4N} \end{bmatrix}. \quad (21)$$

Given the above established building blocks, the btf-ADST can be decomposed as:

$$T_{btf} = D_N \cdot H_N^T \cdot V_N(1) \cdot U_N(1) \cdot V_N(2) \ldots U_N(J-1) \cdot V_N(J) \cdot Q_N \cdot I_N, \quad (22)$$

which directly translates into a butterfly graph. The btf-ADST enables a butterfly structured implementation in a pipeline using parallel computing, which may be performed, for example, by various processing elements such as the processing elements 222A through 222n as described above with respect to FIG. 2B. This butterfly structured implementation in conjunction with the SIMD operations, for example as described above with respect to FIG. 2B, provides speed-up as compared to the original ADST operating via matrix multiplication.

Figure 3C:
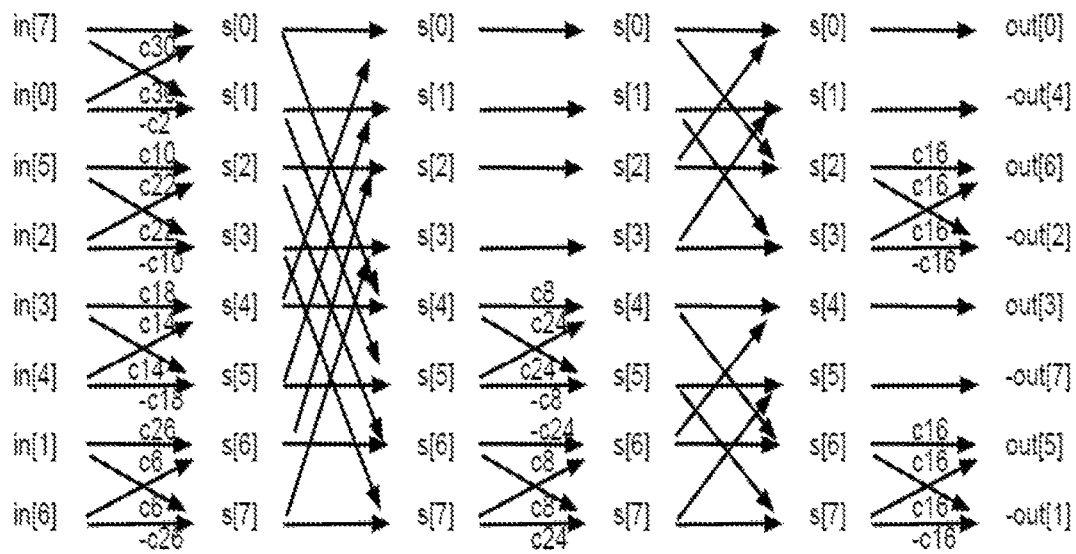
FIG. 3C is a diagram illustrating an example of a hardware operational flow that may be used for hybrid transform coding.

FIG. 3C is a diagram illustrating an example of a hardware operational flow that may be used for hybrid transform coding. The example shown in FIG. 3C shows an 8×8 butterfly structure data flow of the variant ADST, as an example. The example shown in FIG. 3C may serve as one prototype of a hardware implementation of the transform kernel described here. It is possible to create a different implementation of the same transform kernel by permuting the order of butterfly elements.

Figure 4:
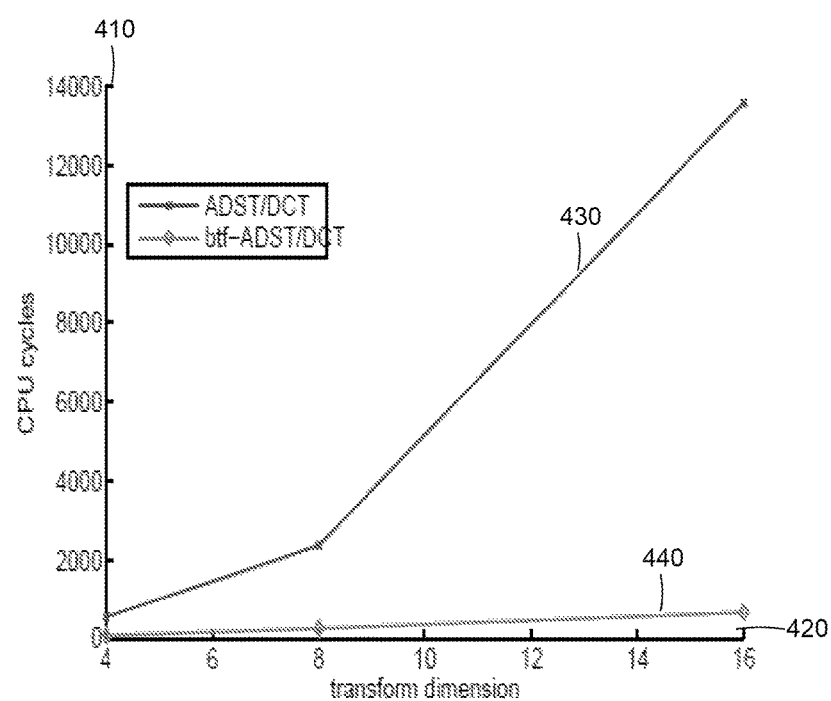
FIG. 4 is a block diagram illustrating computational complexity of systems and methods described here in terms of CPU cycles.

The runtime of the btf-ADST/DCT compared to the original ADST/DCT hybrid transform schemes, in terms of the average CPU cycles, is shown in FIG. 4. As shown in FIG. 4, the y-axis 410 depicts a number of CPU cycles. The x-axis 420 depicts a transform dimension. The implementation was using streaming SIMD extension 2 (SSE2) and the experiments were running on a 64-bit platform. As shown in FIG. 4, the line 430 plots the ADST/DCT hybrid transform scheme runtimes, and the line 440 plots the btf-ADST/DCT hybrid transform scheme runtimes. Thus, the btf-ADST implementation allows efficient hardware utilization and thereby substantial codec speed-up, while closely resembling the compression gains of the original ADST.

Accordingly, this variant of ADST transform whose kernel approximates the original ADST basis-wisely and is consistent with the DCT kernel, thereby enables the butterfly structured implementation. The described scheme allows efficient hardware utilization for significant codec speed-up, while retaining the compression performance of a hybrid transform coding scheme.

Figure 5:
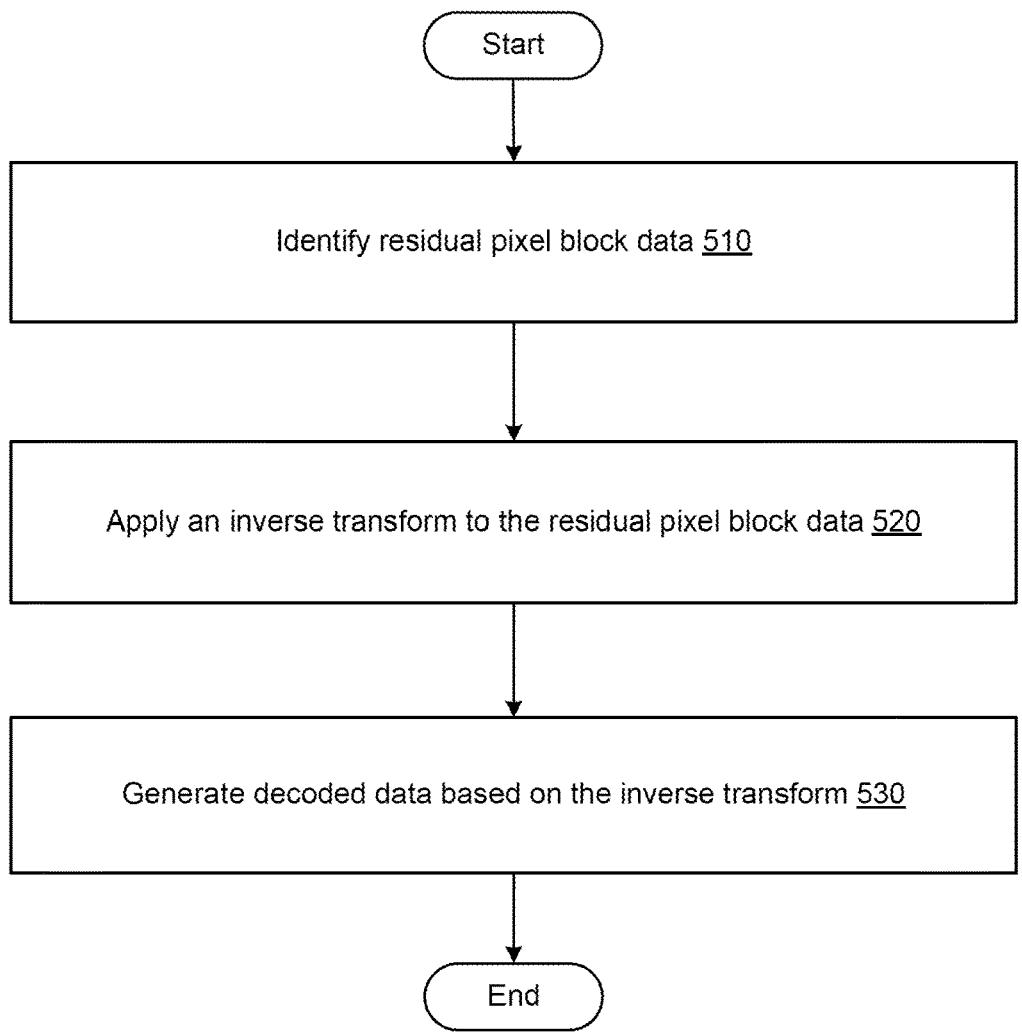
FIG. 5 is a flow diagram illustrating an example decoding process that may be used with systems described here.

FIG. 5 is a flow diagram illustrating an example decoding process that may be used with systems described here. The process shown in FIG. 5 may be performed in part by, for example, a decoder such as the decoder 130 shown in FIG. 1. The process includes identifying residual pixel block data (510). The data block may be a 2D residual pixel block, for example. The decoder may apply an inverse transform to the residual pixel block data (520). The decoding process uses inverse transform, which is the transpose of each stage (or matrix) shown in the equation (22) in reverse order. The decoder may generate decoded data based on the inverse transform (530). As an example of a transformation applied to a 2D residual pixel block, the system may have two transforms Ta and Tc, and residual block R. Applying Ta in the vertical direction, and Tc in the horizontal direction of R translates into: Ta*R*Tc^t, where ^t denotes matrix transpose. As mentioned above, the butterfly structured hybrid-transform disclosed here may be implemented using parallel computing via SIMD operations to achieve faster compression of a bitstream.

Figure 6:
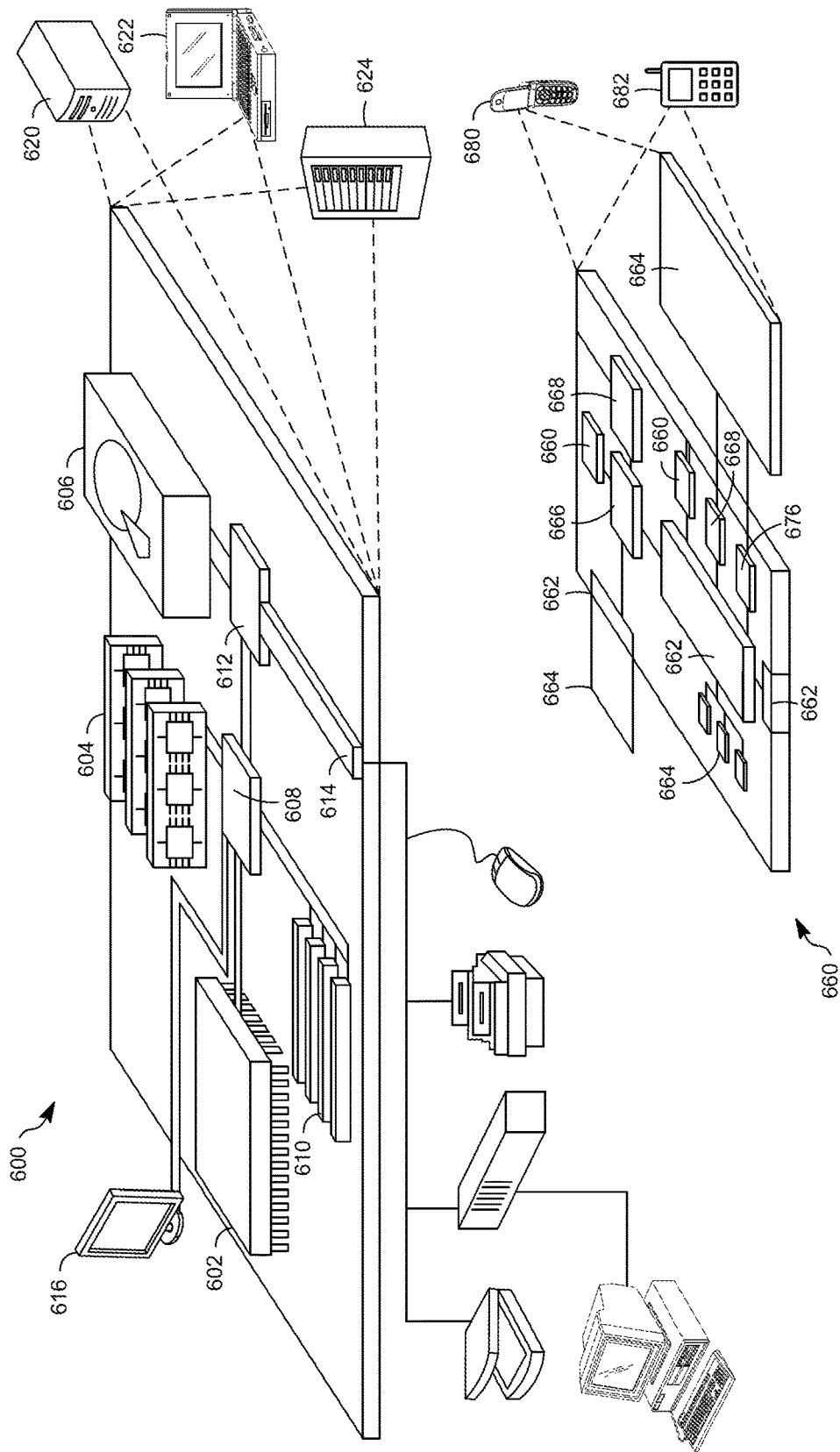
FIG. 6 is a block diagram illustrating example or representative computing devices and associated elements that may be used to implement one or more systems and methods described here, in accordance with aspects of the disclosure.

FIG. 6 is a block diagram illustrating example or representative computing devices and associated elements that may be used to implement one or more systems and methods described here, in accordance with aspects of the disclosure.

In an implementation, FIG. 6 shows an example of a computer device 600 and a mobile computer device 650 (e.g., mobile communication device including a low-power mobile communication device, such as, for example, mobile phone, cellular phone, etc.), which may be used in accordance with aspects, methods, and techniques, as described and provided herein. The computing device 600 may represent various forms of digital computers, such as personal computers, laptops, tablets, desktops, workstations, personal digital assistants, servers, blade servers, mainframes, and other appropriate computers. The computing device 650 may represent various forms of mobile devices, such as personal digital assistants, cellular telephones, smart phones, and other similar computing devices. The components shown herein, their connections and relationships, and their functions, are meant to be exemplary only, and are not meant to limit implementations described herein and/or claimed in this disclosure.

The computing device 600 may include one or more processors 602, memory 604, a storage device 606, a high-speed interface 608 connecting to memory 604 and high-speed expansion ports 610, and a low speed interface 612 connecting to low speed bus 614 and storage device 606. One or more of the components 602, 604, 606, 608, 610, and 612, are interconnected using various busses, and may be mounted on a common motherboard or in other manners as appropriate. In an implementation, the processor 602 may be configured to process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be utilized, as appropriate, along with multiple memories and types of memory. Further, multiple computing devices 600 may be connected, with the device providing portions of the necessary operations (e.g., as a server bank, a group of blade servers, or a multi-processor system).

The memory 604 may be configured to store information within the computing device 600. In an implementation, the memory 604 may comprise one or more volatile memory units. In another implementation, the memory 604 may comprise one or more non-volatile memory units. The memory 604 may comprise another form of non-transitory computer-readable medium, such as a magnetic or optical disk.

The storage device 606 may be configured for providing mass storage for the computing device 600. In an implementation, the storage device 606 may comprise a non-transitory computer-readable medium, such as a floppy disk device, a hard disk device, an optical disk device, or a tape device, a flash memory, or other similar solid state memory device, or an array of devices, including devices configured for use in a storage area network or various other configurations. In some implementations, a computer program product may be tangibly embodied in an information carrier. The computer program product may include instructions that, when executed, perform one or more methods, such as those described herein. In another implementation, the information carrier may comprise a non-transitory computer-readable medium or a non-transitory machine-readable medium, such as the memory 604, the storage device 606, or memory on the processor 602.

The high speed controller 608 may be configured to manage bandwidth-intensive operations for the computing device 600, while the low speed controller 612 may be configured to manage lower bandwidth-intensive operations. Such allocation of functions may be exemplary only. In an implementation, the high-speed controller 608 may be coupled to the memory 604, the display 616 (e.g., through a graphics processor or accelerator), and/or to the high-speed expansion ports 610, which may be configured to accept various expansion cards (not shown). In the implementation, low-speed controller 612 may be coupled to the storage device 606 and/or the low-speed expansion port 614, wherein the low-speed expansion port, which may include various communication ports (e.g., USB, BLUETOOTH, ETHERNET, wireless ETHERNET, etc.) may be coupled to one or more input/output devices, such as a keyboard, a pointing device, a scanner, or a networking device, such as a switch or router, e.g., through a network adapter.

The computing device 600 may be implemented in a number of different forms, in a manner as shown in FIG. 6. For example, the computing device 600 may be implemented as a standard server 620, or multiple times in a group of such servers. The computing device 600 may be implemented as part of a rack server system 624. In addition, the computing device 600 may be implemented in a personal computer (PC), such as a laptop computer 622. In another implementation, components from the computing device 600 may be combined with other components in a mobile device (not shown), such as device 650. One or more of such devices may include one or more of computing devices 600, 650, and an entire system may be made up of multiple computing devices 600, 650 communicating with one another.

The computing device 650 may include one or more processors 652, memory 664, an input/output device, such as a display 654, a communication interface 666, and a transceiver 668, among various other components. The device 650 may be provided with a storage device, such as a micro-drive or some other related device, to provide additional storage. One or more of the components 650, 652, 664, 654, 666, and 668 may be interconnected using various buses, and several of the components may be mounted on a common motherboard or in other manners as appropriate.

The processor 652 may be configured to execute instructions within the computing device 650, including instructions stored in the memory 664. The processor 652 may be implemented as a chipset of chips that include separate and multiple analog and digital processors. In an implementation, the processor 652 may provide for coordination of the other components of the device 650, such as control of user interfaces, applications run by device 650, and wireless communication by device 650.

The processor 652 may be configured to communicate with a user through a control interface 658 and a display interface 656 coupled to a display 654. The display 654 may comprise, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In an implementation, an external interface 662 may be provided in communication with the processor 652 to enable near area communication of device 650 with various other devices. In an example, the external interface 662 may provide for wired communication in some implementations, or for wireless communication in other implementations, and multiple interfaces may be utilized.

The memory 664 may be configured to store information within the computing device 650. The memory 664 may be implemented as one or more of a non-transitory computer-readable medium or media, one or more volatile memory units, or one or more non-volatile memory units. Expansion memory 674 may be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, in an example, expansion memory 674 may include instructions to carry out or supplement the processes described above, and may include secure information. Thus, for example, the expansion memory 674 may be provided as a security module for device 650, and may be programmed with instructions that permit secure use of device 650. Further, secure applications may be provided via the SIMM cards, along with additional information, such as placing identifying information on the SIMM card in a secure manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

The device 650 may be configured to communicate wirelessly through communication interface 666, which may include digital signal processing circuitry where necessary. In an implementation, a communication interface 666 may provide for communications under various modes or protocols, such as GSM voice calls, SMS, EMS, or MMS messaging, CDMA, TDMA, PDC, WCDMA, CDMA2000, or GPRS, among others. In an example, such communication may occur, for example, through a radio-frequency transceiver 668. Further, short-range communication may occur, such as using a Bluetooth, WiFi, or other such transceiver (not shown). Still further, a GPS (Global Positioning System) receiver module 670 may provide additional navigation- and/or location-related wireless data to device 650, which may be used as appropriate by applications running on device 650.

The device 650 may be configured to communicate audibly using audio codec 660, which may receive spoken information from a user and convert it to usable digital information. In an example, an audio codec 660 may likewise generate audible sound for a user, such as through a speaker, e.g., in a handset of the device 650. In various implementations, such sound may include sound from voice telephone calls, may include recorded sound (e.g., voice messages, music files, etc.) and may include sound generated by applications operating on the device 650.

The computing device 650 may be implemented in a number of different forms, in a manner as shown in FIG. 6. For example, the computing device 650 may be implemented as a mobile communication device 680 including a cellular telephone and/or some other low power mobile communication devices. In another example, the computing device 650 may be implemented as part of a smart phone 682, personal digital assistant, or some other similar mobile device.

As such, various implementations of the systems, methods, and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that is configured to receive machine instructions as a machine-readable signal. In various examples, the term "machine-readable signal" may refer to any signal used to provide machine instructions and/or data to a programmable processor.

In an implementation, to provide for interaction with a user, the systems, methods, and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other types of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In various examples, the systems, methods, and techniques as described herein may be implemented in a computing system that includes a back end component (e.g., as a data server), or that includes a middleware component (e.g., an application server), or that includes a front end component (e.g., a client computer having a graphical user interface or a web browser through which a user may interact with an implementation of the systems, methods, and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from one another and typically interact through a communication network. The relationship of client and server arises by virtue of computer programs running on the respective computers and having a client-server relationship to one another.

The above embodiments that have been described in particular detail are merely example or possible embodiments, and that there are many other combinations, additions, or alternatives that may be included.

The particular naming of the components, capitalization of terms, the attributes, data structures, or any other programming or structural aspect is not mandatory or significant, and the mechanisms that may be used to implement aspects of the disclosure or its features may have different names, formats, or protocols. Further, the system may be implemented via a combination of hardware and software, as described, or entirely in hardware elements. Further, any particular division of functionality between the various system components described herein is merely exemplary, and not mandatory; functions performed by a single system component may instead be performed by multiple components, and functions performed by multiple components may instead performed by a single component.

Further, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium storing instructions that when executed by a processor of a video encoder cause the processor to perform a process, the instructions comprising instructions to:
   identify a video data block using a video codec; and
   transform the video data block by generating an instruction to apply a transform kernel of a butterfly asymmetric discrete sine transform (ADST) to process a plurality of data in the video data block using a butterfly structure in a parallel pipeline, wherein
      the transform kernel is implemented in an integer format,
      the butterfly ADST is implemented as a dot product of a permutation matrix having a block dimension with reordering operations, rotational operations and translational operations, and
      the reordering operations, rotational operations and translational operations having a same matrix height.

2. The non-transitory computer-readable storage medium of claim 1, wherein the integer format is implemented as $T_{btf} = D_N \cdot H_N^T V_N(1) \cdot U_N(1) \cdot V_N(2) \ldots U_N(J-1) \cdot V_N(J) \cdot Q_N \cdot I_N$, where $T_{btf}$ is the butterfly ADST, N is a block dimension, J is a height of a matrix, I and $D_N$ denote the re-ordering operations, $V_N(J)$ are the rotational operators, $U_N(J)$ are the translational operators and $H_N$ is a permutation matrix.

3. The non-transitory computer-readable storage medium of claim 1, wherein the transform kernel includes a combination of a discrete cosine transform (DCT) and the butterfly ADST transform having a basis that is asymmetric.

4. The non-transitory computer-readable storage medium of claim 1, wherein the processor communicates with a single instruction memory and control processor.

5. The non-transitory computer-readable storage medium of claim 1, the instructions further comprising instructions to:
   select a set of one-dimensional transforms depending on a prediction direction.

6. The non-transitory computer-readable storage medium of claim 1, the instructions further comprising instructions to:
   select a set of one-dimensional transforms depending on a prediction direction, and
   form a two-dimensional transform using the set of one-dimensional transforms.

7. The non-transitory computer-readable storage medium of claim 1, wherein the butterfly ADST is applied to a residual pixel block generated from the video data block.

8. The non-transitory computer-readable storage medium of claim 1, wherein the transform kernel provides for parallel computing via single instruction multiple data operations.

9. An apparatus, comprising:
a processor executing a video codec configured to identify a video data block; and
a hybrid transform encoder configured to:
identify a video data block using a video codec, and
transform the video data block by generating an instruction to apply a transform kernel of a butterfly asymmetric discrete sine transform (ADST) to process a plurality of data in the video data block using a butterfly structure in a parallel pipeline, wherein
the transform kernel is implemented in an integer format,
the butterfly ADST is implemented as a dot product of a permutation matrix having a block dimension with reordering operations, rotational operations and translational operations, and
the reordering operations, rotational operations and translational operations having a same matrix height.

10. The apparatus of claim 9, wherein the integer format is implemented as $T_{btf} = D_N \cdot H_N^T \cdot V_N(1) \cdot U_N(1) \cdot V_N(2) \ldots U_N(J-1) \cdot V_N(J) \cdot Q_N \cdot \bar{I}_N$, where $T_{btf}$ is the butterfly ADST, N is a block dimension, J is a height of a matrix, $\bar{I}$ and $D_N$ denote the re-ordering operations, $V_N(J)$ are the rotational operators, $U_N(J)$ are the translational operators and $H_N$ is a permutation matrix.

11. The apparatus of claim 9, wherein the processor communicates with a single instruction memory and control processor.

12. The apparatus of claim 9, further comprising:
a selector configured to select a set of one-dimensional transforms depending on a prediction direction.

13. The apparatus of claim 9, further comprising:
a selector configured to form a two-dimensional transform using a set of one-dimensional transforms.

14. The apparatus of claim 9, wherein the butterfly ADST is applied to a residual pixel block generated from the video data block.

15. The apparatus of claim 9, wherein the butterfly structured implementation provides for parallel computing via single instruction multiple data operations.

16. A non-transitory computer-readable storage medium storing instructions that when executed by a processor of a video encoder cause the processor to perform a process, the instructions comprising instructions to:
provide an intra-frame coding scheme for a video data block using a combination of a discrete cosine transform (DCT) and a butterfly asymmetric discrete sine transform (ADST) transform having a transform kernel approximating an original ADST, the original ADST having an asymmetric basis;
identify the video data block using the coding scheme; and
transform the video data block by generating an instruction to apply a transform kernel of a butterfly asymmetric discrete sine transform (ADST) to process a plurality of data in the video data block using a butterfly structure in a parallel pipeline, wherein
the transform kernel is implemented in an integer format,
the butterfly ADST is implemented as a dot product of a permutation matrix having a block dimension with reordering operations, rotational operations and translational operations, and
the reordering operations, rotational operations and translational operations having a same matrix height.

17. The non-transitory computer-readable storage medium of claim 16, wherein the integer format is implemented as $T_{btf} = D_N \cdot H_N^T \cdot V_N(1) \cdot U_N(1) \cdot V_N(2) \ldots U_N(J-1) \cdot V_N(J) \cdot Q_N \cdot \bar{I}_N$, where $T_{btf}$ is the butterfly ADST, N is a block dimension, J is a height of a matrix, $\bar{I}$ and $D_N$ denote the re-ordering operations, $V_N(J)$ are the rotational operators, $U_N(J)$ are the translational operators and $H_N$ is a permutation matrix.

18. The non-transitory computer-readable storage medium of claim 16, wherein the processor communicates with a single instruction memory and control processor.

19. The non-transitory computer-readable storage medium of claim 16, the instructions further comprising instructions to:
select a set of one-dimensional transforms depending on a prediction direction, and
form a two-dimensional transform using the set of one-dimensional transforms.

20. The non-transitory computer-readable storage medium of claim 16, wherein the transform kernel provides for parallel computing via single instruction multiple data operations.

* * * * *